March 22, 1938. A. C. HOOF 2,111,590
NONMETALLIC GEAR WHEEL AND METHOD FOR MAKING THE SAME
Filed Aug. 20, 1935
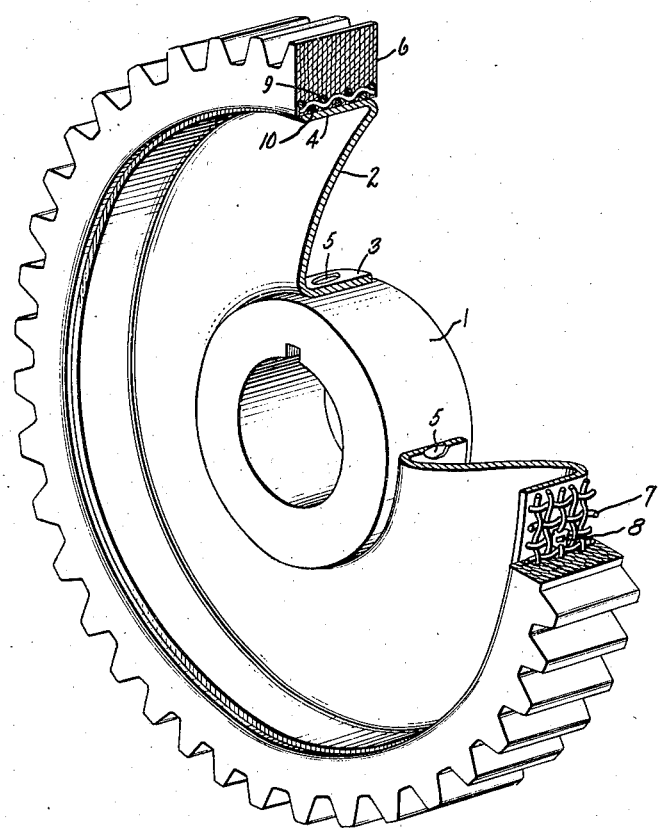
Inventor:
Addison C. Hoof,
by *Harry E. Dunham*
His Attorney.

Patented Mar. 22, 1938

2,111,590

UNITED STATES PATENT OFFICE 2,111,590

NONMETALLIC GEAR WHEEL AND METHOD FOR MAKING THE SAME

Addison C. Hoof, Hinsdale, Ill.

Application August 20, 1935, Serial No. 37,029

19 Claims. (Cl. 74—445)

The present invention relates to non-metallic gear wheels or gear wheel blanks and to a method for making the same.

The object of my invention is to provide an improved construction and method of making non-metallic gear wheels or gear wheel blanks. For a consideration of what I believe to be novel and my invention, attention is directed to the accompanying description and the claims appended thereto.

In the drawing, the figure is a perspective view partly in section of a completed gear wheel embodying my invention.

Referring to the drawing, the hub of the gear wheel comprises a metal sleeve 1 which is adapted to be secured to a shaft and an annular metal disk 2 having oppositely extending flanges 3 and 4 concentric with the sleeve and extending respectively from the inner and outer edges of the disk. The inner flange 3 is suitably secured to the periphery of the sleeve 1, for example, by spot welds 5. The body of the disk is offset so that the flanges 3 and 4 are in substantial radial alignment. The disk forms the web of the gear wheel so that only the rim portion of the gear wheel need be made of the relatively expensive non-metallic material. This construction therefore decreases the cost of the gear wheel.

Since the stresses are greatest at the rim of the gear wheel, it is important that the non-metallic rim 6 of the gear wheel be firmly attached to the rim flange 4. This is accomplished by securing a foraminous metal sheet such as a wire mesh screen 7 to the outer surface of the flange 4 and by subsequently molding the rim 6 of non-metallic material to the flange. The screen 7 is shown secured to the flange 4 by spot welds 8 at suitably spaced points, but other methods of integral attachment such as line welding, arc welding, and brazing could be used. By attaching the screen to the flange 4 prior to molding, the screen may be more readily attached thereto. By attaching the screen to the flange at spaced points, the intermediate portions of the screen may be slightly spaced from the surface of the flange so that they may be more completely embedded in the rim 6 and thereby more securely attach the rim of the rear wheel to the flange 4.

In the manufacture of the gear wheel blank, the hub 1 described above with the disc 2 attached to it is placed in a mold, and an annulus of non-metallic material which is to form the rim 6 of the gear wheel is placed around the outer surface of the flange 4. This material may consist of textile fibres, such as sheets of fabric, treated with an artificial resin, such as a phenolic condensation product which hardens into the hard infusible state under heat and pressure. Before insertion into the mold, the non-metallic material is preferably heated until plastic under light pressure and pressed to form a preform of substantially the outside dimensions of the completed gear wheel blank. The preform is then placed in the mold around flange 4 and subjected to further heat and pressure to form the completed gear wheel blank. The gear wheel blank may be subjected to further curing and heat treatment after which it is ready for machining, as desired.

During this molding, the non-metallic material flows around the wire mesh screen embedding the wires of the screen as shown in the sectional view. The portions 9 of the wires which are spaced from the flange 4 are completely embedded in the non-metallic material. The portions 10 of the wires which are in contact with the flange 4 are surrounded on each side by the non-metallic material, and, due to the increase in section of the wires from the surface of the flange, these portions of the wires are firmly secured to the non-metallic material. Viewed from one aspect the wire mesh screen can be considered as a plurality of wires which are secured to the flange 4 at spaced points with the intermediate portions spaced from the flange so that the non-metallic material can flow under the raised portions of the wires. It will be noted that the section of the wires is a minimum adjacent the surface of the flange 4 and that the section of the wires increases until the maximum diameter of the wire is reached at distances further from the surface of the flange. The wires therefore provide dovetails which securely hold the non-metallic material to the flange.

It is therefore apparent that the rim 6 of the gear wheel blank is firmly secured to the wire mesh screen and, since the wire mesh screen is welded to the flange 4, the rim is firmly attached thereto.

What I claim as new and desire to secure by Letters Patent of the United States is:

1. A non-metallic gear wheel or gear wheel blank comprising a metal part adapted to be operatively connected to a shaft, wires secured to a surface of said part at spaced points, portions of said wires intermediate said points being spaced from said surface, and an annulus of non-metallic material molded to said surface and embedding the intermediate portions of said wires.

2. A non-metallic gear wheel or gear wheel blank comprising a metal part adapted to be operatively connected to a shaft, a wire mesh screen secured to a surface of said part, and an annulus of non-metallic material molded to said surface and embedding the screen.

3. A non-metallic gear wheel or gear wheel blank comprising a metal part adapted to be operatively connected to a shaft, a wire mesh screen secured to a surface of said part at spaced points, portions of said screen intermediate said points being spaced from said surface, and an annulus of non-metallic material molded to said surface and embedding the screen.

4. A non-metallic gear wheel or gear wheel blank having metal parts comprising a sleeve and a disk attached to said sleeve, a wire mesh screen fastened to said disk, and a rim of non-metallic material molded to said disk and said wire mesh screen.

5. A non-metallic gear wheel or gear wheel blank having metal parts comprising a sleeve and an annular disk having oppositely facing flanges at the inner and outer edges thereof, the inner flange being secured to said sleeve and the outer flange forming the rim of the part, a wire mesh screen secured to a surface of the rim flange, and a rim of non-metallic material molded to said surface and embedding the screen.

6. A non-metallic gear wheel or gear wheel blank comprising a metal part adapted to be operatively connected to a shaft, a foraminous metal sheet secured to a surface of said part at spaced points, portions of said sheet intermediate said points being spaced from said surface, and an annulus of non-metallic materal molded to said surface and embedding said sheet.

7. The method of making a non-metallic blank having a metal part adapted to be operatively connected to a shaft which comprises securing wires to a surface of said part at spaced points so that portions of said wires intermediate said points are spaced from said surface, and subsequently molding an annulus of non-metallic material to said surface embedding the intermediate portions of said wires therein.

8. The method of making a non-metallic gear wheel blank having a metal part adapted to be operatively connected to a shaft which comprises securing a wire mesh screen to a surface of the part, and subsequently molding an annulus of non-metallic material to said surface.

9. The method of making a non-metallic gear wheel blank having a metal part adapted to be operatively connected to a shaft which comprises securing a wire mesh screen to a surface of said part at spaced points so that portions of said screen intermediate said points are spaced from said surface, and subsequently molding an annulus of non-metallic material to said surface.

10. The method of making a non-metallic gear wheel blank having a metal part adapted to be operatively connected to a shaft which comprises securing a foraminous metal sheet to a surface of said part at spaced points so that portions of said sheet intermediate said points are spaced from said surface, and subsequently molding an annulus of non-metallic material to said surface.

11. A metal part for a non-metallic gear wheel or gear wheel blank comprising a sleeve adapted to be secured to a shaft and a metal surface concentric with said sleeve, and wires secured to said surface at spaced points so that portions of said wires intermediate said points are spaced from said surface, said wires forming a surface for molding an annulus of non-metallic material to said part.

12. A metal part for a non-metallic gear wheel or gear wheel blank comprising a metal sleeve adapted to be secured to a shaft and a metal surface concentric with said sleeve, and a wire mesh screen secured to said surface, said screen forming a surface for molding an annulus of non-metallic material to said part.

13. A metal part for a non-metallic gear wheel or gear wheel blank comprising a sleeve adapted to be secured to a shaft, an annular metal disk having oppositely facing flanges at the inner and outer edges thereof, the inner flange being secured to said sleeve and the outer flange forming the rim of the part, and a wire mesh screen secured to the surface of the rim flange, said screen forming a surface for molding a rim of non-metallic material to said part.

14. A metal part for a non-metallic gear wheel or gear wheel blank comprising a sleeve adapted to be secured to a shaft and a metal surface concentric with said sleeve, and a foraminous metal sheet secured to said concentric surface at spaced points so that portions of said sheet intermediate said points are spaced from said surface, said sheet forming a surface for molding an annulus of non-metallic material to said part.

15. A non-metallic gear wheel or gear wheel blank comprising a metal disc adapted to be secured to a shaft, a wire mesh screen operatively connected to a surface of said disc at spaced points, portions of said screen intermediate said points being spaced from said surface, and an annulus of non-metallic material molded to said surface and embedding said screen.

16. A non-metallic gear wheel or gear wheel blank comprising a metal disc having a flange and wire mesh screen secured to said flange, and an annulus of non-metallic material molded to said flange and embedding said screen.

17. A metal part for a non-metallic gear wheel or gear wheel blank comprising a disc adapted to be operatively connected to a shaft, and a wire mesh screen secured to said disc, said screen forming a surface for molding an annulus of non-metallic material to said disc.

18. A metal part for a non-metallic gear wheel or gear wheel blank comprising a metal disc having a flange, and a wire mesh screen secured to said flange, said screen forming a surface for molding an annulus of non-metallic material to said flange.

19. A non-metallic gear wheel or gear wheel blank having a metal part adapted to be operatively connected to a shaft, said metal part including a surface concentric with the shaft, a wire mesh screen integrally attached to said surface, and an annulus of non-metallic material molded to said surface and embedding said screen.

ADDISON C. HOOF.